(12) United States Patent
Kang et al.

(10) Patent No.: US 6,516,946 B1
(45) Date of Patent: Feb. 11, 2003

(54) COMPACT DISK RECEIVING DEVICE

(76) Inventors: Shih-Chang Kang, 10 Floor, No. 21, Min Sheng Rd., Sec. 1, Pan Chiao City, Taipei Hsien (TW); Cheng Chien Lin, 6-12 Floor, No. 109, Shiang Shi Rd., Nan Twen Dist, Taichung City (TW)

(*) Notice: Subject to any disclaimer, the term of this patent is extended or adjusted under 35 U.S.C. 154(b) by 0 days.

(21) Appl. No.: 09/907,875

(22) Filed: Jul. 19, 2001

(51) Int. Cl.[7] .............................................. B65D 85/57
(52) U.S. Cl. ..................... 206/310; 206/308.1; 206/303
(58) Field of Search ................................ 206/310, 303, 206/493, 308.1

(56) References Cited

U.S. PATENT DOCUMENTS

| | | | | |
|---|---|---|---|---|
| 5,626,225 A | * | 5/1997 | Joyce, Jr. ................. | 206/308.1 |
| 5,746,315 A | * | 5/1998 | Luckow .................... | 206/308.1 |
| 5,813,526 A | * | 9/1998 | Grobecker et al. ...... | 206/308.1 |
| 6,116,416 A | * | 9/2000 | Hansen et al. ............. | 206/303 |

* cited by examiner

*Primary Examiner*—David T. Fidei
(74) *Attorney, Agent, or Firm*—Charles E. Baxley (57) ABSTRACT

A compact disk receiving device includes a base having a plurality of engaging members extending from a surface of the base and the engaging members are arranged as a circle. At least two of the engaging members each have at least two protrusions extending from an outer periphery thereof and the at least two protrusions are located at different distances from the surface of the base. At least two compact disks are mounted to the engaging members and are separated by the at least two protrusions.

3 Claims, 10 Drawing Sheets

COMPACT DISK RECEIVING DEVICE

FIELD OF THE INVENTION

The present invention relates to a compact disk receiving device having a plurality of engaging members extending from a surface of the base of the device and each engaging member having a plurality of protrusions so that compact disks are positioned between the protrusions.

BACKGROUND OF THE INVENTION

Figure 1:
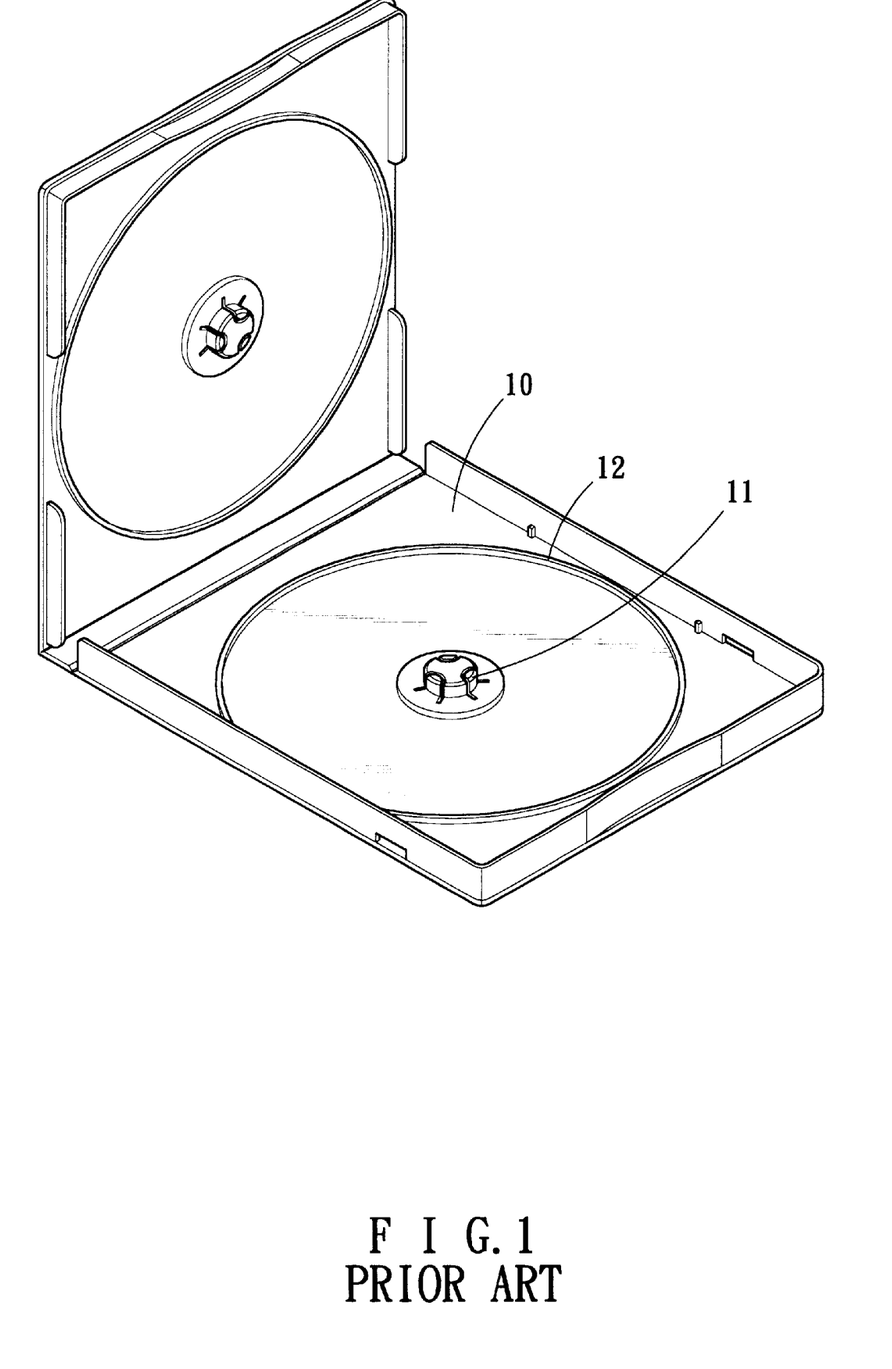
FIG. 1 is a perspective view to show a first embodiment of the conventional compact disk receiving device.
Figure 2:
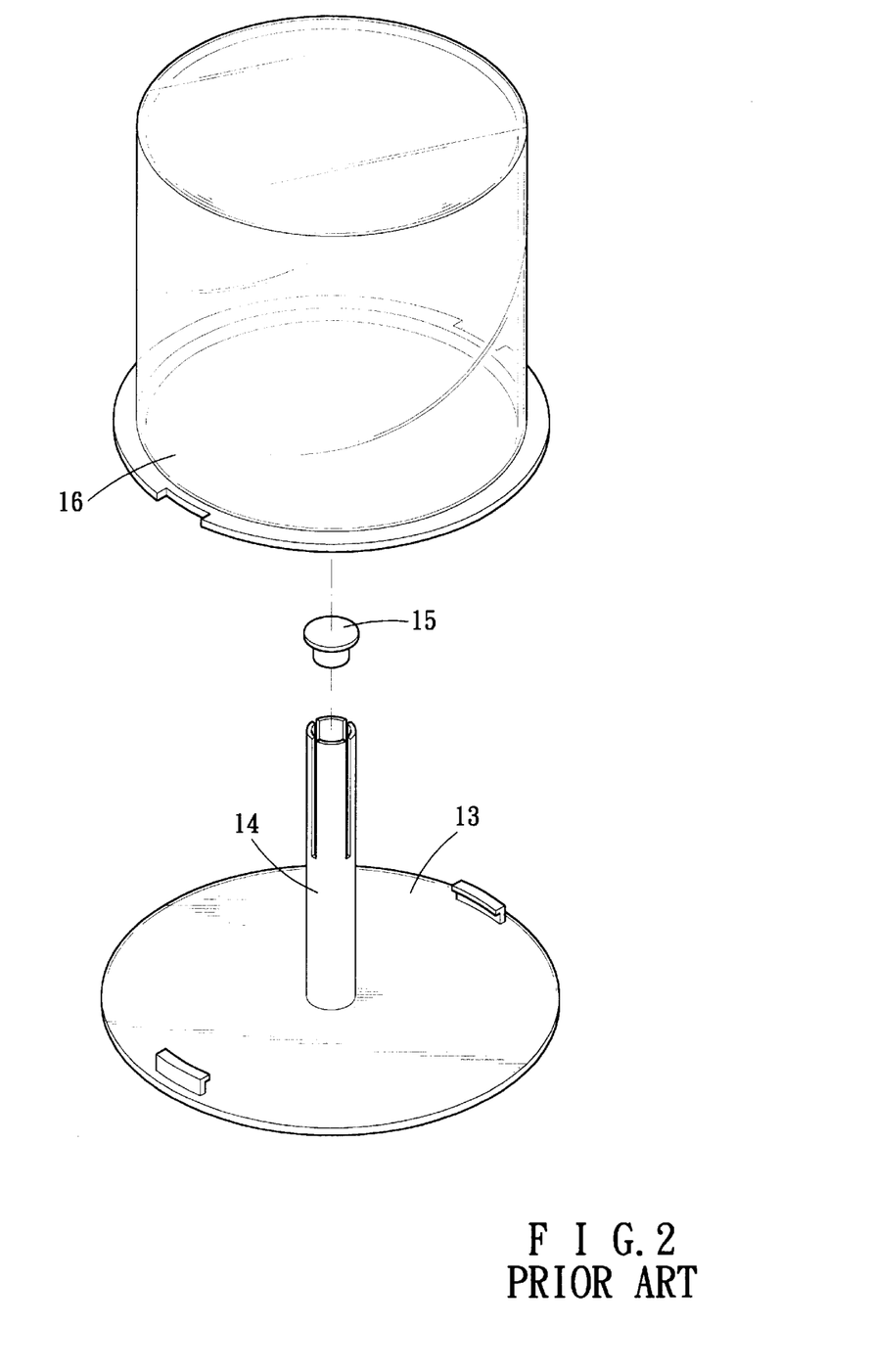
FIG. 2 is an exploded view to show a second embodiment of the conventional compact disk receiving device.

A conventional compact disk receiving device is shown in FIG. 1 and generally includes a base with three engaging members 11 extending from a top surface thereof, and a cover which can be mounted to the base 10. The engaging members 11 are located as a circle and are able to be pushed inward so that a compact disk is mounted to the engaging members 11. An inner periphery of the hole of the compact disk is urged by the outward force of the engaging members 11 so as to held the compact disk. A soft ring 12 is connected to the top surface of the base 10 so that the surface of the compact disk will not be scraped. Only one compact disk is allowed to be engaged with the engaging members 11. If another compact disk is to be received, another three engaging members 11 are required to be connected to the receiving device at proper positions. FIG. 2 shows another embodiment of the compact disks receiving device wherein a post 14 extends from the top surface of the base 13 and a cap 15 is to be engaged with a top end of the post 14. A cover 16 is mounted to the base 13 to enclose the compact disks mounted to the post 14. However, the compact disks on the post 14 are not positioned properly so that any two adjacent surfaces of two consecutive compact disks could be scraped with each other.

SUMMARY OF THE INVENTION

In accordance with one aspect of the present invention, there is provided a compact disk receiving device which comprises a base having a plurality of engaging members extending from a surface of the base and at least two of the engaging members each have at least two protrusions extending from an outer periphery thereof. The at least two protrusions are located at different distances from the surface of the base so as to separate two compact disks mounted to the engaging members.

The primary object of the present invention is to provide a compact disk receiving device that allow plural compact disks to be received and the compact disks are separated from each other.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 3:
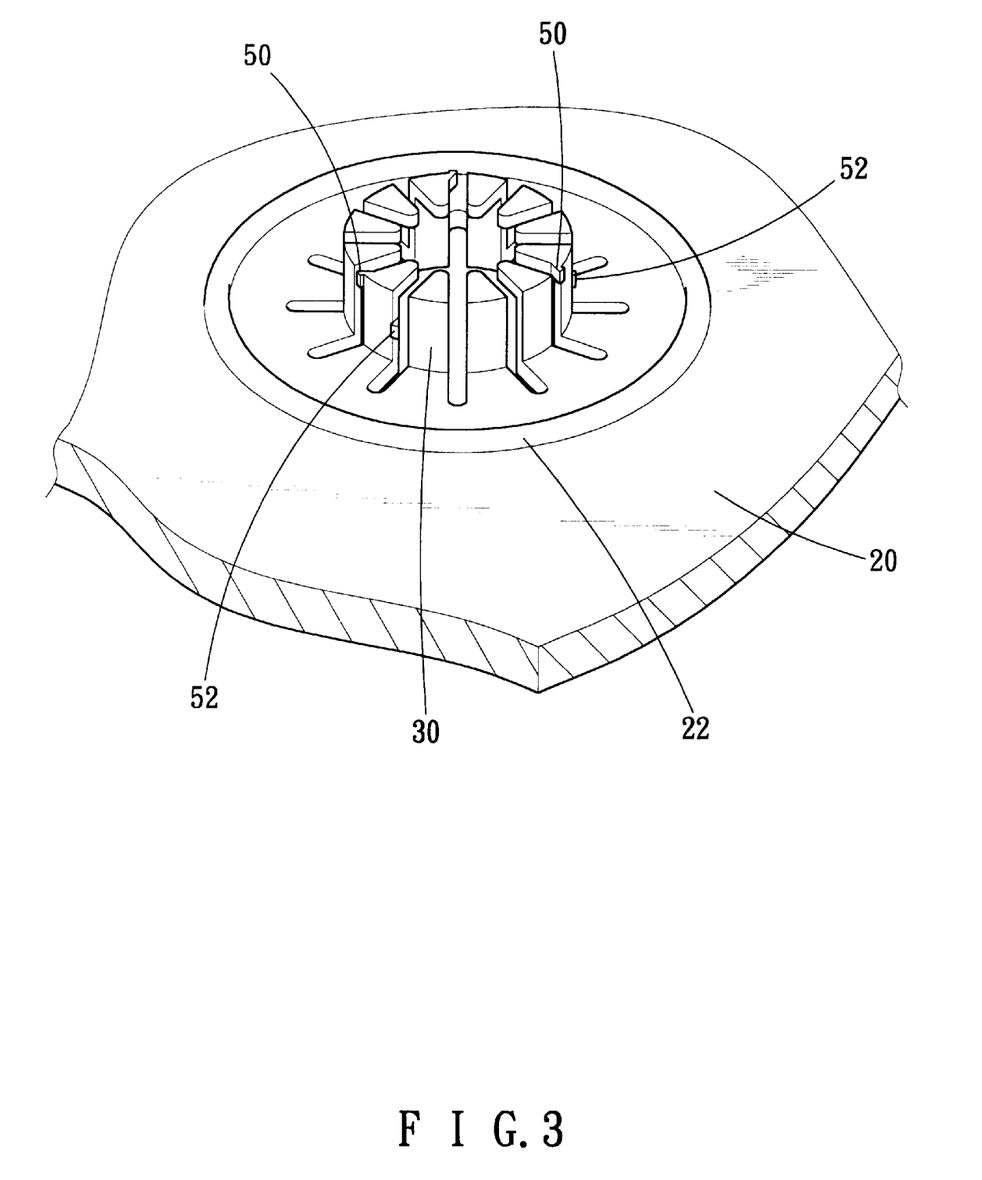
FIG. 3 is a perspective view to show the compact disk receiving device of the present invention.
Figure 4:
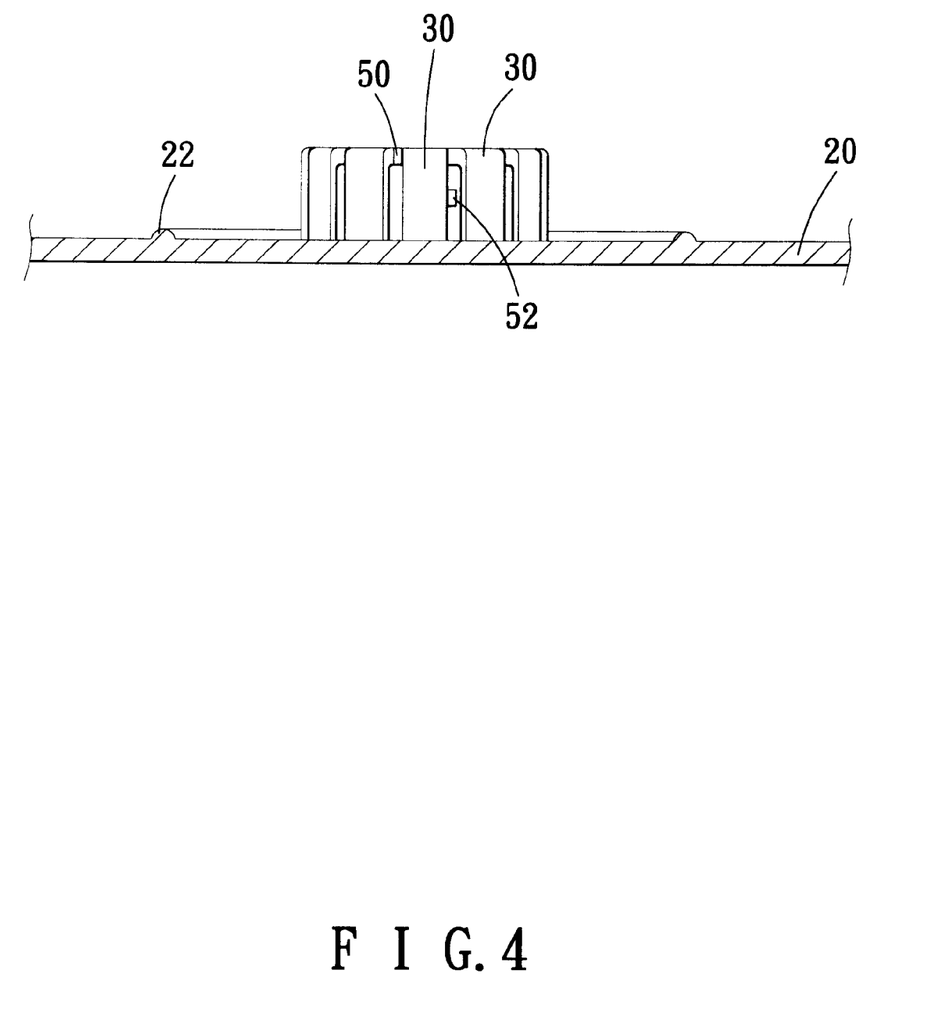
FIG. 4 is a cross sectional view to show the engaging members on the base of the compact disk receiving device of the present invention.
Figure 5:
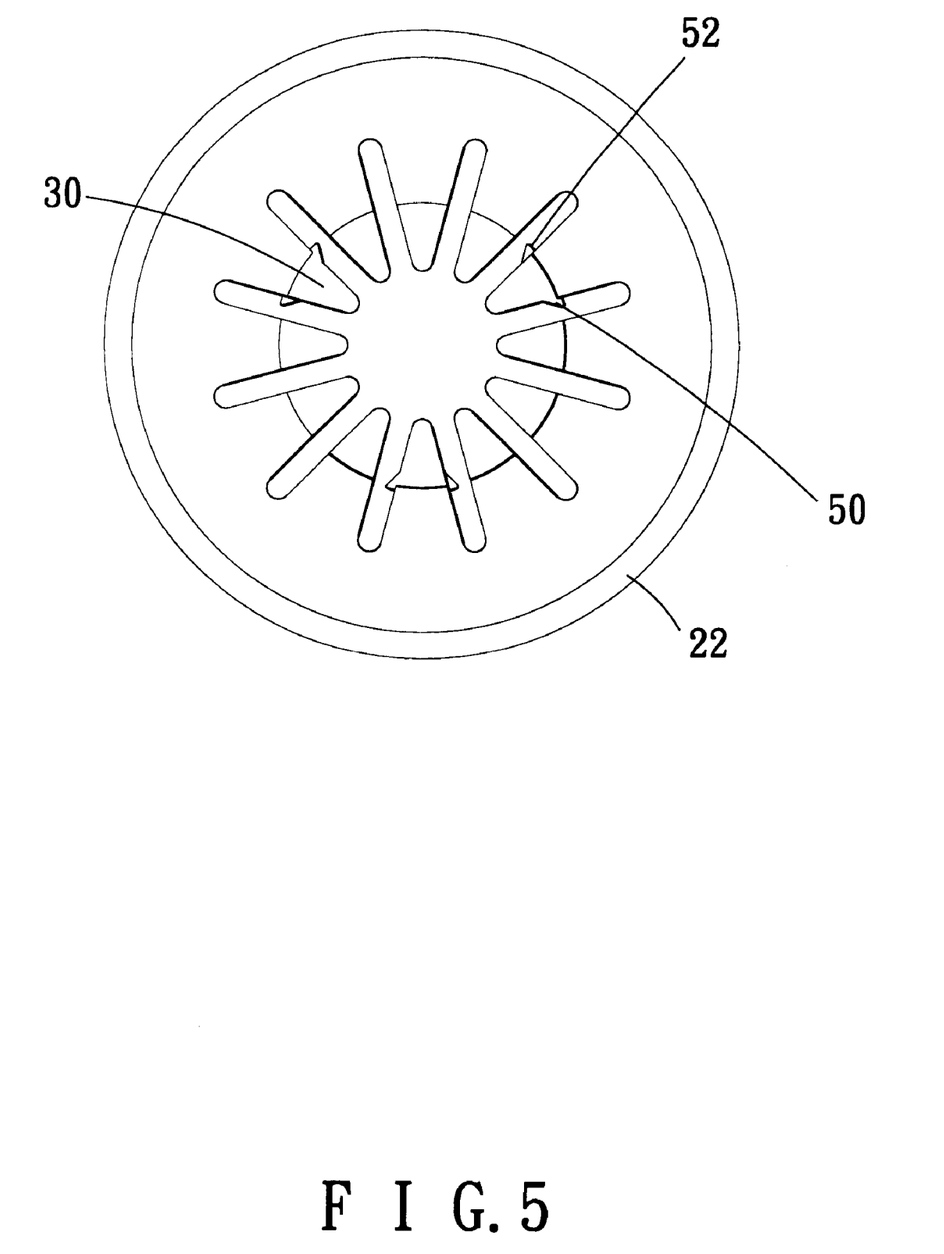
FIG. 5 is a plan view to show the engaging members on the base of the compact disk receiving device of the present invention.

Referring to FIGS. 3 to 5, the compact disk receiving device of the present invention comprises a base 20 having a plurality of engaging members 30 extending from a surface of the base 20 and the engaging members 30 are arranged as a circle. A soft support member 22 which is a circuit member extends from the surface of the base 20 and the engaging members 30 are enclosed by the soft support member 22.

Figure 6:
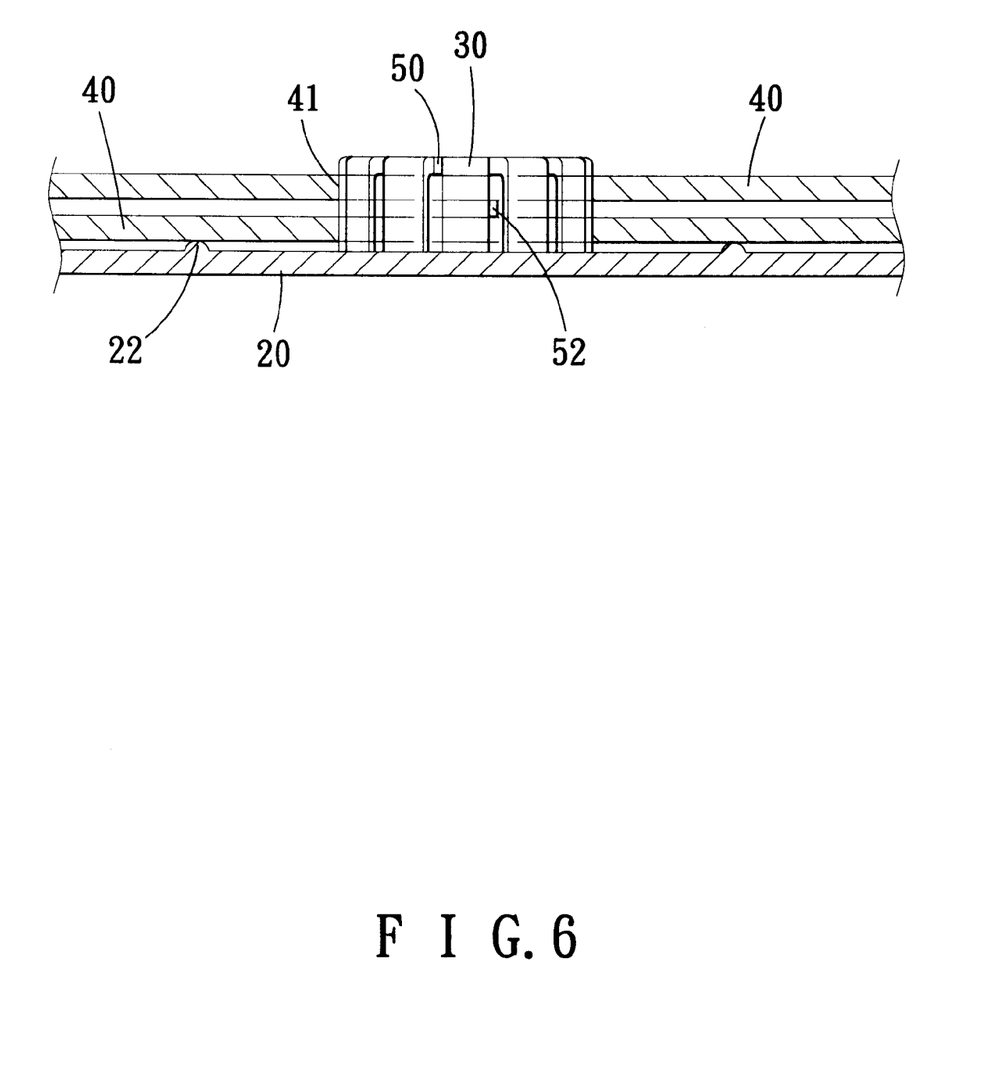
FIG. 6 shows two compact disks are mounted to the engaging members on the base of the compact disk receiving device of the present invention.

Three wedge-shaped engaging members 30 which are respectively located at 90-degree position, 210-degree position, and 330-degree position in the circle of the engaging members 30 each have two protrusions 50, 52 respectively extending from two sides of an outer periphery thereof. The protrusions 50, 52 are located in the gap between the two engaging members 30 and each side of the outer periphery of the engaging member 30 has only one protrusion 50 or 52. The protrusions 50, 52 of each of the three engaging members 30 are located at different distances from the surface of the base 20. As shown in FIG. 6, two compact disks 40 are mounted to the engaging members 30 by their central holes 41 and the lower one of the compact disks 40 is supported on the soft support member 22 and the protrusions 52 are located between the two compact disks 40. The upper one of the compact disks 40 is secured between the two protrusions 50 and 52. By this arrangement, either of the two compact disks 40 is not scraped.

Figure 7:
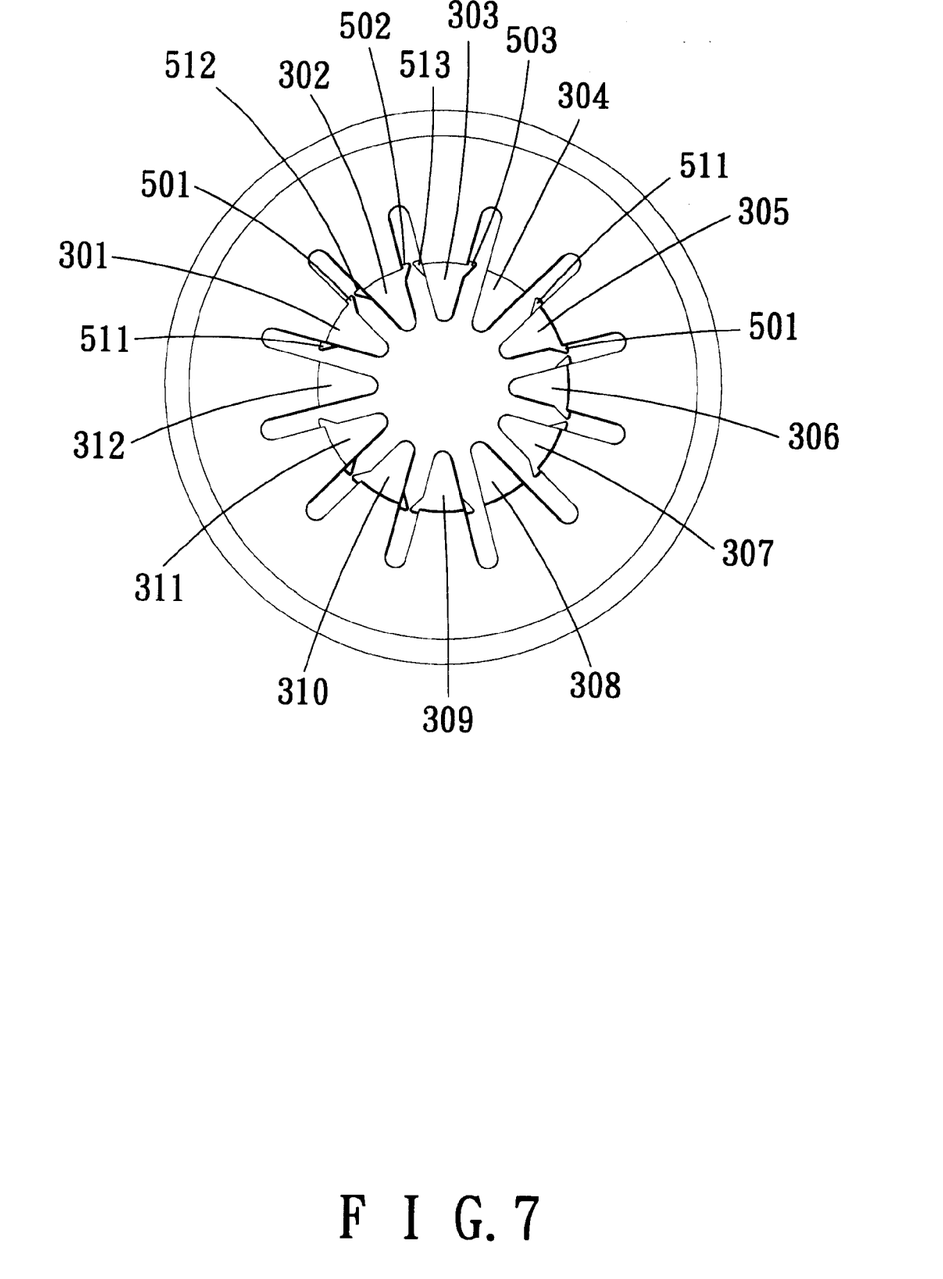
FIG. 7 is a plan view to show another embodiment of the engaging members on the base of the compact disk receiving device of the present invention.
Figure 8:
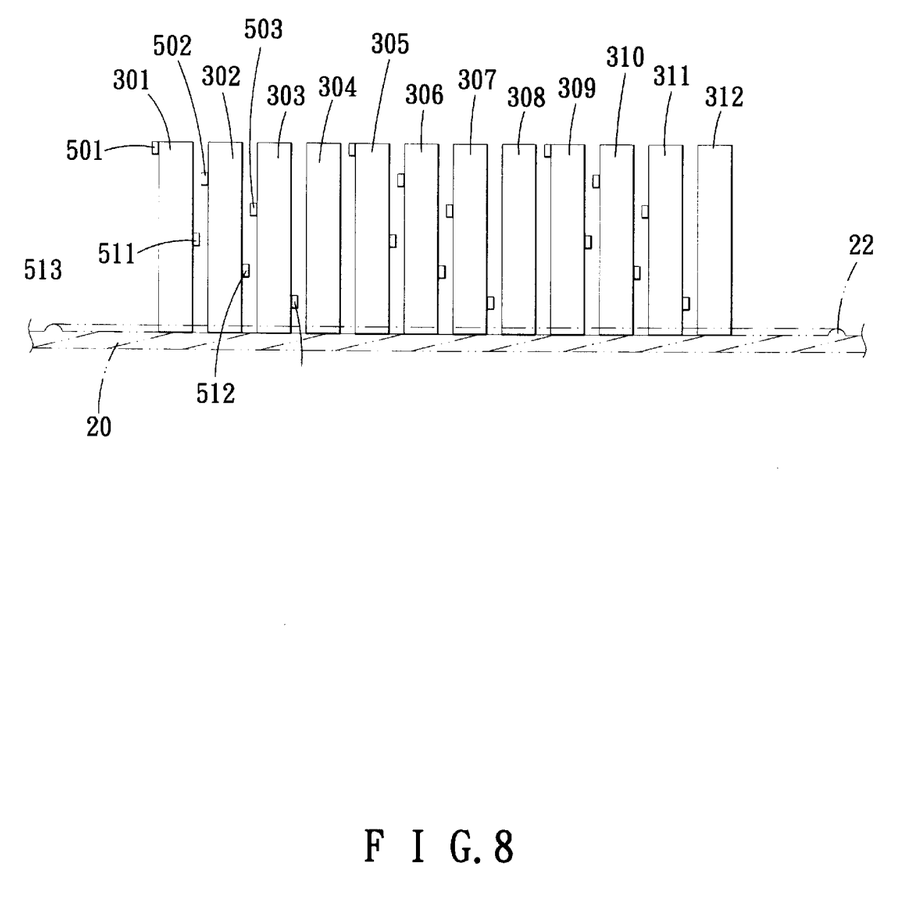
FIG. 8 is a cross sectional view to show the arrangement of the protrusions on the engaging members of the present invention as shown in FIG. 7.

FIGS. 7 and 8 show that there are 12 engaging members 301 to 312 on the base 20. The engaging members 301, 305, 309 each have two protrusions 501 and 511 at different height positions. The engaging members 302, 306, 310 each have two protrusions 502 and 512 at different height positions. The engaging members 303, 307, 311 each have two protrusions 503 and 513 at different height positions. As shown in FIG. 8, six compact disks can be mounted to the engaging members 301 to 312, and the six compact disks are separated by these protrusions 501 511, 502, 512, 503, 513.

Figure 9:
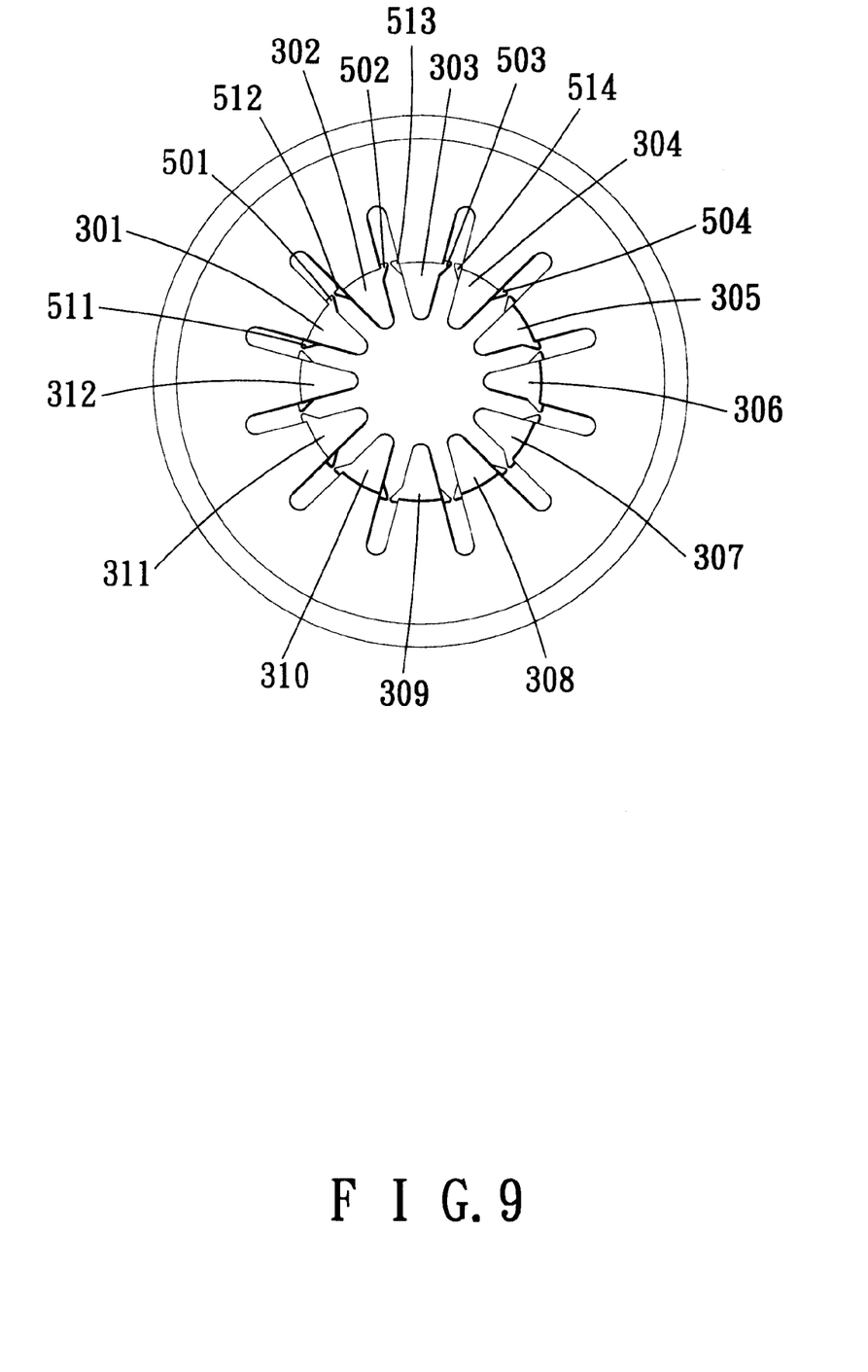
FIG. 9 is a plan view to show yet another embodiment of the engaging members on the base of the compact disk receiving device of the present invention.
Figure 10:
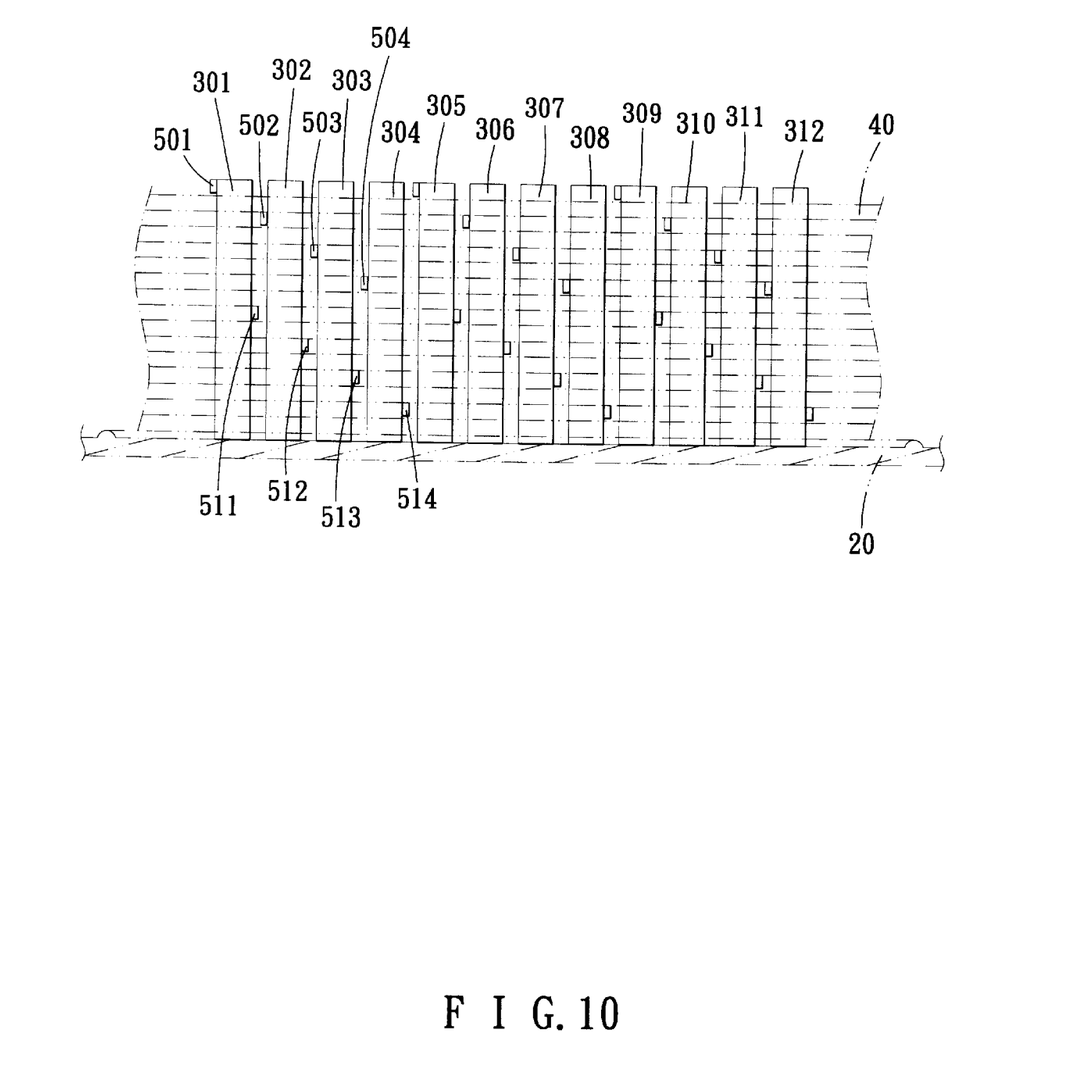
FIG. 10 is a cross sectional view to show the arrangement of the protrusions on the engaging members of the present invention as shown in FIG. 9.

Similarly, as shown in FIGS. 9 and 10, according to the arrangement of the protrusions shown in FIGS. 7 and 8, the engaging members 304, 308, 312 each have two protrusions 504 and 514 at different height positions. This arrangement allows up to 12 compact disks to be mounted and secured on the engaging members.

The protrusions of the present invention effectively separate the compact disks from being scraped with each other.

While we have shown and described the embodiment in accordance with the present invention, it should be clear to those skilled in the art that further embodiments may be made without departing from the scope of the present invention.

What is claimed is:

1. A compact disk receiving device comprising:

a base having a plurality of engaging members extending from a surface of said base, three of the engaging members each having two protrusions respectively extending from two sides of an outer periphery thereof and the protrusions located in a gap between two adjacent engaging members, said two protrusions located at different distances from said surface of said base.

2. The compact disk receiving device as claimed in claim 1, wherein only one protrusion extends from each side of the outer periphery of the three engaging members.

3. A compact disk receiving device comprising:

a base having a plurality of engaging members extending from a surface of the base and arranged as a circle, the engaging members being cataloged into three groups which are located equally separated in the circle, each group including three engaging members and each engaging member having two protrusions respectively extending from two sides of an outer periphery thereof and the protrusions located in a gap between two adjacent engaging members, the protrusions of each group of the engaging members located at different distances from the surface of the base.

* * * * *